United States Patent
Tam et al.

(10) Patent No.: US 9,533,480 B2
(45) Date of Patent: Jan. 3, 2017

(54) LAMINATES MADE FROM ULTRA-HIGH MOLECULAR WEIGHT POLYETHYLENE TAPE

(71) Applicant: HONEYWELL INTERNATIONAL INC., Morristown, NJ (US)

(72) Inventors: Thomas Tam, Chesterfield, VA (US); Mark Benjamin Boone, Mechanicsville, VA (US); Henry Gerard Ardiff, Chesterfield, VA (US); Brian H. Waring, Chesterfield, VA (US); Brian D. Arvidson, Chesterfield, VA (US); Ashok Bhatnagar, Richmond, VA (US); Steven Correale, Chester, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 121 days.

(21) Appl. No.: 13/708,360

(22) Filed: Dec. 7, 2012

(65) Prior Publication Data
US 2014/0170429 A1    Jun. 19, 2014

Related U.S. Application Data

(60) Provisional application No. 61/570,071, filed on Dec. 13, 2011.

(51) Int. Cl.
*B32B 27/32* (2006.01)
*B32B 37/00* (2006.01)
(Continued)

(52) U.S. Cl.
CPC .............. *B32B 37/00* (2013.01); *B29C 70/04* (2013.01); *B32B 5/26* (2013.01); *B32B 27/32* (2013.01);
(Continued)

(58) Field of Classification Search
CPC .. B32B 27/32; B32B 27/00; B32B 2262/0253; B32B 2305/08; B32B 2305/10; B32B 2309/02; B32B 2309/12; B32B 2571/02; B32B 37/00; B32B 37/06; B32B 5/26; B29C 70/04; F41H 5/0485; Y10T 156/10; Y10T 428/31913
(Continued)

(56) References Cited

U.S. PATENT DOCUMENTS

| | | | |
|---|---|---|---|
| 4,551,296 | A | 11/1985 | Kavesh et al. |
| 4,623,574 | A | 11/1986 | Harpell et al. |

(Continued)

FOREIGN PATENT DOCUMENTS

| | | |
|---|---|---|
| EP | 1627719 | 2/2006 |
| WO | 2007009563 | 1/2007 |
| WO | 2010007062 | 1/2010 |

OTHER PUBLICATIONS

"New Teijin Plant in the Netherlands Makes World's Strongest Tape" from Adhesives and Sealants.com; 1 sheet; http://www.adhesivesandsealants.com/article.mvc/New-Teijin-Plant-In-The-Netherlands-Makes-0001; Oct. 28, 2011.
(Continued)

*Primary Examiner* — Michael B Nelson
(74) *Attorney, Agent, or Firm* — Roberts & Roberts, LLP; Richard S. Roberts, Jr.

(57) ABSTRACT

Disclosed are laminates from multiple stacked plies of a uni-directional tape in which the tape formed from a plurality of ultra-high molecular weight polyethylene gel spun, multi-filament yarns. The resultant laminate contains not more than five percent resin by weight. Related methods of making a laminate of this type are also disclosed.

19 Claims, 1 Drawing Sheet

(51) Int. Cl.
*B29C 70/04* (2006.01)
*B32B 5/26* (2006.01)
*F41H 5/04* (2006.01)
*B32B 37/06* (2006.01)

(52) U.S. Cl.
CPC ............ *F41H 5/0485* (2013.01); *B32B 37/06* (2013.01); *B32B 2262/0253* (2013.01); *B32B 2305/08* (2013.01); *B32B 2305/10* (2013.01); *B32B 2309/02* (2013.01); *B32B 2309/12* (2013.01); *B32B 2571/02* (2013.01); *Y10T 156/10* (2015.01); *Y10T 428/31913* (2015.04)

(58) Field of Classification Search
USPC .................................................. 428/410, 420
See application file for complete search history.

(56) References Cited

U.S. PATENT DOCUMENTS

| | | | |
|---|---|---|---|
| 5,173,138 A | 12/1992 | Blauch et al. | |
| 5,579,628 A | 12/1996 | Dunbar et al. | |
| 6,764,764 B1 | 7/2004 | Tam et al. | |
| 6,797,065 B2 | 9/2004 | Tam et al. | |
| 6,951,685 B1* | 10/2005 | Weedon | D01F 6/04 428/364 |
| 7,148,162 B2 | 12/2006 | Park et al. | |
| 7,223,470 B2 | 5/2007 | Twomey et al. | |
| 7,674,409 B1 | 3/2010 | Tam et al. | |
| 7,923,094 B1 | 4/2011 | Harding et al. | |
| 7,972,679 B1 | 7/2011 | Lyons et al. | |
| 7,993,715 B2 | 8/2011 | Geva et al. | |
| 2002/0037391 A1 | 3/2002 | Harpell et al. | |
| 2008/0064280 A1 | 3/2008 | Bhatnagar et al. | |
| 2009/0117805 A1* | 5/2009 | Simmelink | D01F 1/10 442/392 |
| 2009/0324949 A1 | 12/2009 | Nguyen et al. | |
| 2010/0078851 A1* | 4/2010 | Tam | B29C 70/20 264/210.8 |
| 2010/0159168 A1 | 6/2010 | Wienke et al. | |
| 2011/0039058 A1* | 2/2011 | Tam et al. | 428/105 |
| 2011/0041677 A1 | 2/2011 | De Weijer et al. | |
| 2011/0154980 A1 | 6/2011 | Van Elburg | |
| 2011/0162517 A1 | 7/2011 | Bovenschen et al. | |
| 2012/0121852 A1* | 5/2012 | Tam | B29C 43/22 428/105 |
| 2013/0316105 A1* | 11/2013 | Geva et al. | 428/34.7 |

OTHER PUBLICATIONS

Supplementary European Search Report for Corresponding European Patent Application No. EP2790917.

Raspopov et al., "Ultra-High Molecular Weight Polyethylene. Synthesis and Properties," PLASTICS, NO. 5, P. 16 (2008).

* cited by examiner

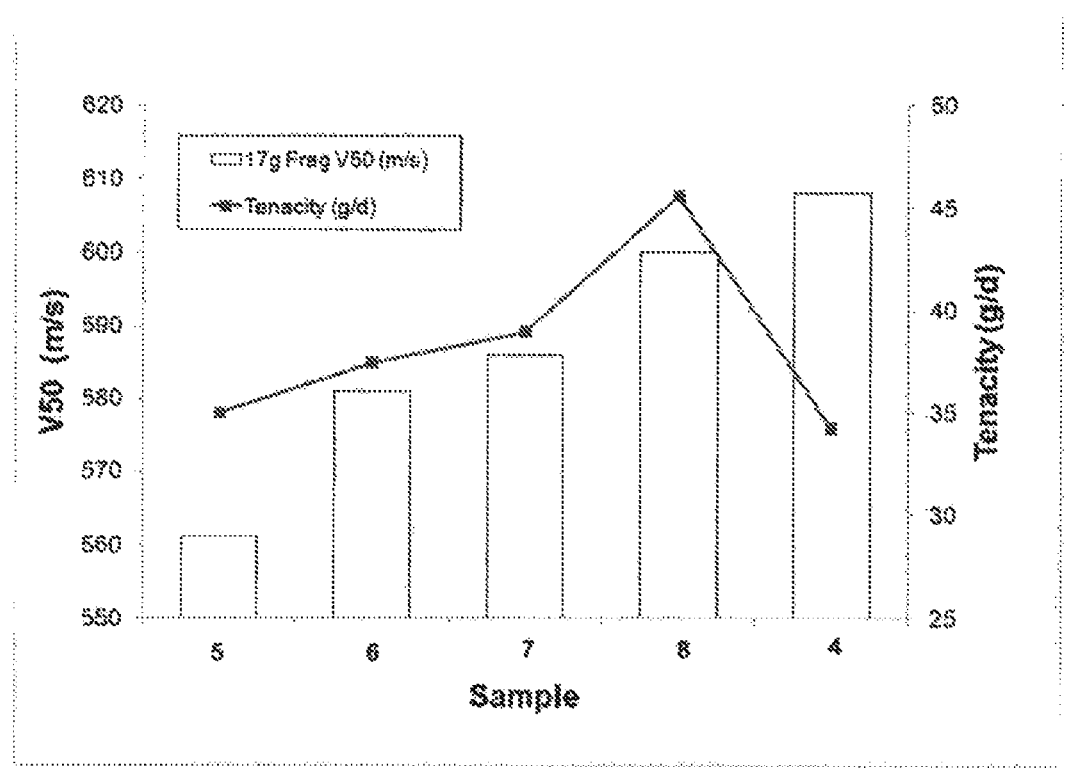

LAMINATES MADE FROM ULTRA-HIGH MOLECULAR WEIGHT POLYETHYLENE TAPE

CROSS-REFERENCE TO RELATED APPLICATIONS

This application claims the benefit of U.S. Provisional Application No. 61/570,071 filed on Dec. 13, 2011, which is incorporated herein by reference in its entirety.

STATEMENT OF FEDERALLY SPONSORED RESEARCH OR DEVELOPMENT

Not applicable.

FIELD OF DISCLOSURE

This disclosure relates to laminates or articles made from a tape produced from ultra-high molecular weight polyethylene yarns and related methods of making these laminates or articles.

BACKGROUND

Impact-resistant and penetration-resistant materials find uses in many applications such as sports equipment, safety garments, and personal body armor.

Various fiber-reinforced constructions are known for use in impact-resistant, ballistic-resistant and penetration-resistant articles such as helmets, panels, and vests. These articles display varying degrees of resistance to penetration by impact from projectiles or knives, and have varying degrees of effectiveness per unit of weight.

For example, a measure of the ballistic-resistance efficiency is the energy removed from a projectile per unit of the target's areal density. This is known as the Specific Energy Absorption, abbreviated as "SEA", and having units of Joules per $kg/m^2$ or $J\text{-}m^2/kg$. The SEA of a fibrous construction is known to generally increase with increasing strength, tensile modulus and energy-to-break of the constituent fibers. However, other factors, such as the shape of the fibrous reinforcement, may come into play. U.S. Pat. No. 4,623,574 presents a comparison between the ballistic effectiveness of a composite constructed with a ribbon-shaped reinforcement versus one using a multi-filament yarn: both of ultra-high molecular weight polyethylene in an elastomeric matrix that substantially coated each of the individual fibers. The fiber had a higher tenacity than the ribbon: 30 grams/denier (g/d) (2.58 GPa) versus 23.6 g/d (2.03 GPa). Nevertheless, the SEA of the composite constructed with the ribbon was somewhat higher than the SEA of the composite constructed with the yarn.

One example of the preparation of UHMWPE melt-blown film is provided by Takashi Nakahara et al., "Ultra High Molecular Weight Polyethylene Blown Film Process," ANTEC 2005, 178-181 (2005). Film made by this process was slit and drawn to make a high strength tape. The tenacity of the tape made from the stretched blown film was less than 20 g/d (1.72 GPa).

U.S. Pat. Nos. 5,091,133; 5,578,373; 6,951,685; and 7,740,779 disclose polyethylene powder being compressed at an elevated temperature to bond the particles into a continuous sheet that is then further compressed and stretched. U.S. Pat. No. 5,091,133 describes a fiber made by this latter process having a tensile strength of 3.4 GPa. Polyethylene tapes so produced are commercially available under the trademark TENSYLON® by BAE Systems. The highest tenacity reported on the TENSYLON® web site is 19.5 g/d (tensile strength of 1.67 GPa).

An example describing the preparation of a UHMWPE composite made from Spectra® fiber is provided by Yachin Cohen et al., "A Novel Composite Based on Ultra-High-Molecular-Weight Polyethylene", Composites Science and Technology, 57, 1149-1154 (1997). Spectra® fibers under tension were treated with a solvent in order to swell the fiber surface and promote adhesion between fibers while forming a prepreg. The yarn prepreg was then wound on a plate to produce unidirectional layers which were then pressed and heated and the solvent removed to yield a composite sheet material containing UHMWPE fiber in a re-crystallized UHMWPE matrix formed from the previously dissolved fiber surfaces. The researchers state that the unique properties of UHMWPE make it a desirable candidate for a matrix material to be used with UHMWPE fibers; however, this had not been possible before the use of their solvent-based process for several reasons: (1) The difference in the melting temperatures of the oriented UHMWPE fibers and the un-oriented UHMWPE matrix is too small, (2) The extremely high melt viscosity of UHMWPE results in negligible melt flow in molding processes for formation of the composite materials, (3) The relatively poor adhesion of untreated UHMWPE fibers to UHMWPE matrix.

U.S. Pat. No. 5,135,804 describes high strength plaques made by heating and pressing unidirectionally aligned gel-spun polyethylene fibers without any solvent or resin treatment of the fibers before pressing. Example plaques were formed by winding fibers around a 3-inch square metal plate and then pressing the assembly for several minutes in a heated press. The hot-pressed UHMWPE plaques were substantially free of voids and essentially transparent.

U.S. Pat. No. 5,628,946 describes a homogeneous polymeric monolith made from thermoplastic polymer fibers which were first pressed into contact with each other at an elevated temperature adequate to selectively melt a portion of the polymer fibers and then pressed at a second higher pressure at the elevated temperature to further consolidate the material. An example of a monolithic sheet of dimensions 3 mm by 55 mm by 55 mm made from Spectra® fiber is given, in which a unidirectionally aligned bundle of the fibers was pressed in a mold at 152° C. for 10 minutes at a first pressure and 30 seconds at a higher pressure. It is stated that a DSC trace of the pressed sheet showed around 350 of a "second phase" formed by melting of the original fiber.

SUMMARY

Traditionally, UHMWPE fibers and tapes made from these UHMWPE fibers have required coating and impregnation the fibers with a resin material. When coating of the fiber or yarn with the resin material is performed, it has been performed in the range of 11 to 25 percent of the total composite weight to maintain the structural integrity of the final product. Extending below 10 percent resin by weight in forming a tape from the fibers or yarns was believed to be detrimental to the mechanical properties of the resultant material because the structural integrity would be compromised.

However, it has been discovered that no resin tapes made from UHMWPE yarns can be fabricated by producing the tape under conditions in which the sections of the yarns bond together without resin. To the extent that resin is present in the tape, the resin is applied after the tape has been formed and usually as a surface layer comprising less than 5 percent of the material by weight to promote bonding of the otherwise resin-free tape to another layer of the resin-free tape.

Although resin-free tapes have a tenacity that is generally less than their resin-containing counterparts, surprisingly and unexpectedly laminates or articles that are made from the low or no resin UHMWPE formed from yarns have exceptional anti-ballistics properties and are more rigid than an article made from a tape having greater amounts of resin (such as, for example, in the range of 11 to 25 percent by weight).

A laminate and a method of making a laminate is disclosed. The resultant laminate may be particularly useful as a ballistic-resistant article such as, for example, a bullet-resistant vest. Moreover, given the exceptional rigidity of the laminate in comparison to other articles made from ultra-high molecular weight polyethylene, the disclosed laminates may also be used in applications which have greater structural requirements such as, for example, helmets.

According to one aspect of the invention, the laminate comprises a body fabricated from multiple stacked plies of a uni-directional tape. The tape is formed from a plurality of ultra-high molecular weight polyethylene gel spun, multi-filament yarns. The laminate contains not more than five percent resin by weight.

A laminate of this type can exhibit enhanced properties in comparison to other known laminates made from UHMWPE materials and resin in the range of 11 to 25 percent.

For example, a ratio of a V50 ballistics value in meters per second of the laminate for a 17 grain frag into a test sample having an areal density of one pound per square foot to a tenacity in grams-force per denier of the precursor tape can exceed 17. The V50 ballistics value can exceed 606 meters per second with the precursor tape tenacity being below 35 grams-force per denier.

Additionally, the disclosed laminates can have rigidities that far exceed the rigidity of other laminates having higher resin concentrations. For example, the Young's modulus of elasticity of the body formed from the tape can be above 15 GPa (approximately 2175 ksi). Whereas many yarn-based articles have Young's moduli of elasticity below 15 GPa, the prepared samples have an elastic modulus just over 35 GPa.

The laminate may have at least some of the multiple stacked plies that are oriented at angles relative to one another. The multiple stacked plies of the tape can be hot-pressed together for consolidation. During the hot-pressing, the plies may be subjected to a temperature in excess of 137° C. (280° F.) during consolidation. In some examples, the temperature applied to the plies during consolidation is 146° C. (295° F.), which is greater than the 132° C. (270° F.) typically applied to form articles from yarn bonded with resin.

The tape formed from ultra-high molecular weight polyethylene gel spun, multi-filament yarns may be substantially free of resin or have no resin. Among other things, this permits for a higher percentage of body of the laminate to be the ultra-high molecular weight polyethylene material that provides the ballistics-resistance qualities to the article. Some minimal amount of resin (i.e., less than five percent by weight) might be used to assist in the bonding process during hot-pressing, although it is contemplated that the process could be entirely without the addition of extra resin. In one form, it is contemplated that resin could be applied to one side of the tape as, for example, a coating, and then this resin could be disposed so as to assist in the connection of the plies to one another. However, it is also possible that portions of the yarns used to form tape could be fused across the plies to bond them together. In one embodiment, at least two adjacent plies of the multiple stacked plies are directly fused together without any resin therebetween.

When a test sample made from the laminate is subjected to a three-point bend test according to ASTM D790 (in which the test sample has a width of approximately 12.7 mm and a depth of approximately 7.88 mm and a span of approximate 12.19 cm), the stress at yield for the test sample may exceed 55 MPa. According to one example, the stress at yield can be just over 85 MPa.

According to another aspect of the invention, a method is disclosed of making a laminate. Multiple plies of tape are stacked on top of one another. The tape forming the plies is formed from a plurality of ultra-high molecular weight polyethylene gel spun, multi-filament yarns and containing not more than five percent resin by weight. Then a heat and a pressure are applied for a duration of time to consolidate the multiple plies of tape into the laminate.

Again, during consolidation, the temperature may be in excess of 137° C., which is greater than temperatures that are typically used during formation of yarn articles. In one example, the temperature applied to the plies during consolidation is 146° C.

As mentioned above, the tape can potentially be of low resin content (i.e., less than about five percent), be substantially free of resin, or have no resin. In one form of the method, the resin may be applied to at least one side of the tape before stacking the multiple plies of tape on top of one another. Then, by applying a heat and a pressure for a duration of time to consolidate the multiple plies of tape into the laminate, the resin can assist in consolidating the multiple plies of tape together.

During stacking, at least some of the multiple stacked plies can be oriented at angles relative to one another. However, it is contemplated that for some applications, the plies could be arranged such that the tape is all oriented in the same direction or portions of the tape are woven into a sheet in an over-under type pattern.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE DRAWINGS

FIG. 1 is a graph providing comparative data of various tape and yarn samples in which the tenacity values of the precursor materials and the V50 values for the laminates formed from each of the material are illustrated.

DETAILED DESCRIPTION

This disclosure relates to further developments in the development of articles made from ultra-high molecular weight polyethylene tape having low or no resin content. The manner of making low or no resin tape and the morphology of the tape are described in greater detail in U.S. patent application Ser. No. 12/539,185 filed on Aug. 11, 2009 entitled "High Strength Ultra-High Molecular Weight Polyethylene Tape Articles" and U.S. patent application Ser. No. 13/021,262 filed on Feb. 4, 2011 also entitled "High Strength Tape Articles From Ultra-High Molecular Weight Polyethylene". The disclosures of both of these applications are incorporated by reference as if they are set forth in their entirety herein.

It has been discovered that by hot-pressing the resin-free tape made by the method of the applications above, a laminate can be formed that has exception ballistics resistance properties and rigidity in comparison to a laminate made from yarns coated in resin and formed into a ply such that the resin typically is in the range of 11 to 25 percent of the laminate. This result is surprising and unexpected because the ballistic qualities of the material typically improve with increased fiber tenacity. In this particular case, it has been found that some laminates made from the resin-free tape, although having a lower tenacity than the yarns which receive the resin, have better ballistic resistance test values and have superior rigidity.

As used herein, the term "high tenacity fibers" means fibers which have a tenacity equal to or greater than about 20 g/d. These fibers preferably have initial tensile modulus of at least about 1000 g/d, as measured by ASTM D2256. Preferred fibers are those having a tenacity equal to or greater than about 30 g/d, and a tensile modulus equal to or greater than about 1200 g/d. Particularly preferred fibers are those having a tenacity of at least 40 g/d, and a tensile modulus of at least 1300 g/d. As used herein, the terms "initial tensile modulus", "tensile modulus" and "modulus" mean the modulus of elasticity as measured by ASTM 2256 for a yarn and by ASTM D638 for a matrix material.

The improved laminates are formed by stacking multiple plies of tape on to one another and hot-pressing the plies so they are consolidated under heat and pressure. The tape is formed from a plurality of ultra-high molecular weight polyethylene gel spun, multi-filament yarns such as is described in U.S. patent application Ser. No. 12/539,185. The tape made by this method is substantially free of resin or has no resin.

Before compressing these plies into a laminate, some small amount of resin could be applied to one or more surfaces of the tape. The amount of resin would constitute under five percent of the total laminate by weight. In some forms, the resin may constitute less than 4 percent, 3 percent, 2 percent or 1 percent of the total weight of the laminate. This resin is not provided to retain the yarns of the tape together as in traditional plies of yarn, but rather to serve as a potential bonding agent between the plies of tape. The resin could be provided in the form of a full or partial coating which could be applied in any of a number of ways including, but not limited to, spraying. However, it should be understood that resin is optional and, when included, will only be included in small amounts (i.e., less than five percent by weight of the laminate). Too much resin lowers the weight ratio of the fibers to the resin which can begin to hinder the ballistics properties of the resultant laminate.

During stacking of the plies, at least some of the multiple stacked plies are oriented at angles relative to one another. For example, a ply may have tape with fibers substantially oriented at a reference angle of 0 degrees and the adjacent plies above and below this ply in the stack may have the fibers of the tape oriented at 90 degrees relative to the reference angle. Any number of plies could be stacked in forming the laminate and the thickness of laminate selected by the altering the number of plies used.

During hot pressing, the temperature of the mold can preferably be above 132° C. and more preferably be above 137° C. According to one embodiment of the method, the molding temperature can be 146° C., which is well above the temperatures typically used in the consolidation of plies containing substantial amounts of resin (i.e., resin in the range of 11 to 25 percent by weight of the laminate). The molding pressure can be varied, but in one preferred form the molding pressure can be 19.14 MPa (2777 psi).

The resultant laminate can be characterized in that it may have a ratio of a V50 ballistics value in meters per second of the laminate for a 17 grain frag into a test sample having an areal density of one pound per square foot to a tenacity in grams-force per denier of the precursor tape that exceeds 17. The V50 ballistics value may exceed 606 meters per second even though the precursor tape tenacity is below 35 g/d.

During three-point bend tests, the resultant laminate from the resin free tape can have stress at yield values that exceed those values in articles made from currently commercially available material. The Young's modulus of elasticity for resultant laminate can be preferably over 15 GPa and, in one form, may be 35 GPa.

Some examples are now provided that offer comparative data between laminates made from the resin free tape and from more traditional materials. These examples are intended to be illustrative, but not limiting.

Example 1

Various test samples were prepared for forming into laminates for a comparison of ballistics resistance. Table I below indicates the base materials that served as the starting materials for the test laminates.

TABLE I

| Sample | Precursor Type | Denier (g/9000 m) | Tenacity (g/d) | Resin (Weight %) |
| --- | --- | --- | --- | --- |
| 1 | Tape | 6358 | 33.8 | No resin |
| 2 | Yarn | 1300 | 37.5 | Prinlin (17%) |
| 3 | Yarn | 1300 | 37.5 | Prinlin (17%) |
| 4 | Tape | 3838 | 34.25 | No resin |
| 5 | Yarn | 1300 | 35.0 | Polyurethane (16%) |
| 6 | Yarn | 1300 | 37.5 | Polyurethane (17%) |
| 7 | Yarn | 1100 | 39.0 | Polyurethane (16%) |
| 8 | Yarn | 780 | 45.6 | Polyurethane (16%) |

Samples 1 and 4 were tape samples that were formed from a plurality of ultra-high molecular weight polyethylene gel spun, multi-filament yarns in which the resultant tape did not include resin. In contrast, samples 2, 3, and 5-8 were formed by taking Spectra® fibers of the above-listed denier and tenacity and impregnating them with the indicated resin material before the fibers were combined into plies.

The tapes formed for sample 1 and sample 4 were prepared using different methods. Sample 1 was prepared by utilizing a two-step process in which the precursor yarns were separately drawn, wound onto a spool, and then unwrapped from the spool and compressed into a tape. In contrast, sample 4 was prepared by drawing the yarns in a heating oven and then compressing them immediately thereafter in a continuous single process to form a tape as is described in U.S. patent publication 2011/039058.

Example 2

To prepare the tape of sample 1, ultra-high molecular weight polyethylene gel spun, multi-filament yarns were taken that initially had tenacity of 45 g/d. These yarns were pre-drawn as provided and then only a minimal stretch was performed (a draw ratio of 1.02) in the oven before the yarns were consolidated into the tape. The temperature of the oven that preheated the fibers was 100° C. and the temperature of the compression step that consolidated the yarns into the tape was 156.5° C.

Again, no resin was used in the formation of tape sample 1. Only the thermal fusion of the ultra-high molecular weight polyethylene gel spun, multi-filament yarns held the tape together.

Example 3

To better characterize the tape material of sample 1, Table II provides data collected during tensile testing that was used to provide the average tenacity of sample 1 found in Table I.

TABLE II

| Sample | Load at Maximum (N) | Strain at Maximum (%) | Tenacity (g/d) | Initial Modulus (g/d) |
|---|---|---|---|---|
| 1-1 | 323.1 | 3.300 | 34.43 | 1119 |
| 1-2 | 278.6 | 2.566 | 29.69 | 1217 |
| 1-3 | 345.3 | 3.433 | 36.80 | 1212 |
| 1-4 | 314.4 | 2.967 | 33.50 | 1197 |
| 1-5 | 310.4 | 3.067 | 33.07 | 1210 |
| 1-6 | 335.2 | 3.400 | 35.72 | 1219 |
| Average | 317.8 | 3.122 | 33.8 | 1196 |

In this instance, a strip of the tape product of sample 1 was cut having a denier of 957 and was tested according to a standard ASTM test method 2256-02 having 10 inch gauge length and 10 inch/min cross head speed. Six test specimens (1-1 though 1-6) were prepared from this cut strip and separately tested for tenacity. As calculated in Table II, the average tenacity value for this specimens was 33.8 g/d, which is the tenacity value found for sample 1 in Table I.

Example 4

Samples 2 and 3 (Table I) were prepared from yarn having initial tenacities of 37.5 g/d and were infused with 17% Prinlin resin to form uni-directional plies. A similar prepared ply product from this process, when cross-plied in four layers, is also known as Spectra Shield® II SR-3124 which is available commercially from Honeywell Specialty Materials of Morristown, N.J.

Example 5

Sample 4 was prepared by stretching or drawing the feeder yarns in a draw ratio of 4.2 in an oven, just prior to consolidating the drawn yarns into a tape using a compression step as a continuous process. This continuous process occurred in a multi-zone oven ramping from 152° C. to 153° C. to 154° C. over six heating zones before the yarns were compressed at 156° C. during consolidation.

Again, no resins were used in the preparation of tape sample 4.

Example 6

Various specimens of the prepared tape sample 4 were cut to collect tenacity data of the material. Table III provides the results of three test cut specimens.

TABLE III

| Sample | Denier (g) | Load at Maximum [N] | Strain at Maximum (%) | Tenacity (g/d) | Initial Modulus (g/d) |
|---|---|---|---|---|---|
| 4-1 | 3838 | 1229.9 | 3.173 | 32.68 | 1231 |
| 4-2 | 3492 | 1209.0 | 3.153 | 35.31 | 1303 |
| 4-3 | 3265 | 1112.9 | 3.013 | 34.76 | 1318 |
| Average | 3532 | 1183.9 | 3.113 | 34.25 | 1284 |

In this instance, specimens 4-1 through 4-3 had different denier values which are indicated in the table. The average calculated tenacity in Table III corresponds to the tenacity of tape sample 4 in Table I.

Example 7

Samples 5 though 8 (Table I) were prepared from yarns having the denier values and tenacities indicated in Table I. The yarn was impregnated with polyurethane resin to form uni-directional plies.

Example 8

The prepared ply materials were then cross-plied (i.e., stacked in planar form with each ply having the yarns oriented 90 degrees from the yarns in the adjacent plies) and hot-pressed to form the laminates. The mold temperatures and pressures for each of the samples is provided below in Table IV.

TABLE IV

| Sample | Mold Pressure (MPa) | Mold Temp. (° C.) |
|---|---|---|
| 1 | 19.14 | 146 |
| 2 | 3.45 | 115 |
| 3 | 19.14 | 146 |
| 4 | 19.14 | 146 |
| 5 | 19.14 | 132 |
| 6 | 19.14 | 132 |
| 7 | 19.14 | 132 |
| 8 | 19.14 | 132 |

In the preparation of the test samples, approximately 40 plies were stacked. The samples were prepared to have an areal density such that one square foot of the final laminate material would have a weight of one pound.

Example 9

V50 data was acquired under conventionally known standardized techniques, particularly per the conditions of Department of Defense Test Method Standard MIL-STD-662F. In brief, the V50 value represents the speed at which one half of the 17 grain FSP projectiles penetrate a test laminate that weighs one pound per square foot. The test involves multiple rounds of data collection while adjusting the speed of the projectile upward or downward until 50 percent of the projectiles pass through the laminate. Accordingly, higher V50 values indicate better ballistics resistance. The resultant V50 data is provided in Table V below.

TABLE V

| Sample | 17gr Frag V50 (m/sec) |
|---|---|
| 1 | 614 |
| 2 | 580 |

TABLE V-continued

| Sample | 17gr Frag V50 (m/sec) |
|---|---|
| 3 | 604 |
| 4 | 608 |
| 5 | 561 |
| 6 | 581 |
| 7 | 586 |
| 8 | 600 |

From Table V, it can be observed that the samples having the best ballistics resistance are the two samples prepared from the resin-less tape.

Referring now to FIG. 1, this ballistics information of the second set of samples (Samples 4 through 8) is then compared to the tenacity of the precursor materials (either yarn or tape). It should be noted that to highlight the differences between the tape sample 4 and the yarn samples 5 through 8, sample 4 has been moved to the far right end of the chart. This data illustrates that although the tape precursor material has a tenacity below the yarn precursor materials, that the laminate formed from the tape material actually exhibits better ballistics resistance.

Example 10

As seen in Table VI below, a number of other laminate samples were prepared from commercially available materials for three-point bend tests. Such tests can be used to characterize the rigidity of a material and collect deformation data. The prepared laminates from commercial materials were made from a Dyneema® HB80 material available from DSM Dyneema of South Stanley, N.C. and various Honeywell Spectra Shield® materials available from Honeywell Specialty Materials of Morristown, N.J. In the instance of the Spectra Shield® 3137 material in Table VI, the number after the hyphen indicates the molding pressure of the laminate. Spectra Shield® and Dyneema® HB80 are made from fiber with tenacity above 35 g/d.

Testing was conducted according to the specifications of the three-point bend test method of ASTM standard D790 at a standard ambient room temperature of approximately 22° C. (72° F.). According to this process, a beam-shaped or bar-shaped specimen is placed evenly on supports at opposite ends of the beam/bar with an open span of a specified distance of 122 mm (4.8 in) between the supports. A load is applied at a specified rate to the center of the specimen, such as with a loading nose, causing the specimen to bend. The load is applied for a specified time. According to the method of ASTM D790, the load is applied until the specimen reaches 50 deflection or until the specimen breaks.

In the inventive example (Tape 4) illustrated below, flexural property testing was performed on the resin-free cross-plied laminate by measuring the displacement at yield, strain at yield, load at yield, stress at yield and energy to yield point for a specimen having a length of approximately 15.24 cm (6 in), a width of approximately 12.7 mm (0.5 in)±approximately 0.508 mm (0.02 in), a depth of approximately 7.874 mm (0.31 in)±approximately 0.508 mm (0.02 in) (1.5 psf areal density), with a span of approximately 12.192 cm (4.8 in) and a strain rate of approximately 0.01 in/in/min as per ASTM D790 Procedure A. For the purposes of this invention, a load was applied at least until at least partial delamination of at least a part of the laminate occurs. Testing was conducted using a universal Instron 5585 testing machine with a three point testing fixture.

The fibers of the tested commercial composites were embedded in various resins (polymeric matrix) materials, some of which are proprietary and thus the tested products are identified by their commercial material designation. The laminates were formed by molding 40 cross-plied layers together at a temperature of about 132° C. (270° F.) and at a pressure of about 3.44 MPa (500 psi) for about 10 min.

TABLE VI

| Sample | Width (mm) | Depth (mm) | Disp. at Yield (mm) | Strain at Yield (mm/mm) | Load at Yield (N) | Stress at Yield (MPa) | Initial Modulus (GPa) | Young's Modulus (GPa) |
|---|---|---|---|---|---|---|---|---|
| DSM HB80 | 12.76 | 7.71 | — | 0.0788 | 214.3 | 52.3 | 5.76 | 10.94 |
| 3130 | 12.53 | 8.00 | 0.752 | 0.0024 | 92.3 | 21.3 | 9.09 | 9.84 |
| 3135 | 12.58 | 7.95 | 1.953 | 0.0063 | 68.7 | 16.0 | 4.42 | 5.04 |
| 3137-500 | 12.64 | 8.29 | 0.808 | 0.0027 | 96.0 | 20.5 | 8.12 | 8.87 |
| 3137-1000 | 12.66 | 8.02 | 1.019 | 0.0033 | 101.2 | 23.0 | 8.00 | 8.43 |
| 3137-1500 | 12.66 | 7.92 | 0.942 | 0.0030 | 110.9 | 25.9 | 9.58 | 10.30 |
| Tape 4 | 12.90 | 7.82 | 1.913 | 0.0060 | 366.8 | 86.0 | 27.20 | 35.12 |

Notably, for test samples having comparable dimensions, the new laminate made from tape 4 according to the method described in the examples above exhibit heretofore unseen rigidness. Compared to any of the other commercial materials, the load at yield is 366.8 N which exceeds value of the next nearest commercially available sample by almost 700. Likewise, the Young's modulus of elasticity of the laminate made from tape 4 is more than triple the next nearest value of the commercial materials.

Example 11

Additional three-point bend tests were performed at elevated temperature to provide comparative data between laminates formed from the Dyneema® HB80 and laminates formed from the tape 4. Table VII, below, provides load at yield values for tests three-point bend tests run at room temperatures (from Table VI above) and from three-point bend tests run at 71.1° C. (160° F.)

TABLE VII

| Sample | 3 Pt Bend Conditions | Load at Yield (N) |
|---|---|---|
| DSM HB80 | Room Temp | 214 |
| DSM HB80 | 71.1° C. | 158 |
| Tape 4 | Room Temp | 366 |
| Tape 4 | 71.1° C. | 323 |

It should be noted that the tests run at elevated temperature (i.e., at 71.1° C.) were performed on samples having a span of only 10.16 cm (4.0 inches) because of limitations of the oven size on the Instron® Test Machine.

Notably, the laminates made from the tape 4 material exhibit comparably better high temperature three-point bend results than the Dyneema® HB80 laminates. While the Dyneema® HB80 tests exhibit an approximately 30% drop in load at yield at the higher temperatures, the inventive laminates made from tape 4 exhibit only an approximately 10% drop in load at yield.

The laminate made from the resin-less tape (or substantially resin free tape) may exhibit improved high temperature strength over a comparable laminate containing resin in amounts of greater than 5 weight percent. While laminates containing resin may have the resin soften at elevated temperatures (e.g., approximately 71.1° C.) and adversely effect the structural integrity of the laminate, laminates such as those made from the inventive tape 4 material which are substantially free of resin do not exhibit the same magnitude of drop in mechanical properties such as three-point bend load at yield.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A laminate comprising multiple uni-directional tape plies, each tape ply being fabricated from a plurality of multi-filament tape precursors, each multi-filament tape precursor being formed from at least one ultra-high molecular weight polyethylene gel spun, multi-filament yarn and wherein each multi-filament tape precursor is produced by a process comprising:
   a) selecting at least one polyethylene multi-filament yarn, said yarn having a c-axis orientation function of at least 0.96, an intrinsic viscosity when measured in decalin at 135° C. by ASTM D1601-99 of from about 7 dl/g to about 40 dl, g, and said yarn having a tenacity of from about 15 g/d to about 100 g/d as measured by ASTM D2256-02 at a 10 inch (25.4 cm) gauge length and at an extension rate of 100%/min;
   b) placing said yarn under a longitudinal tensile force and subjecting said yarn to at least one transverse compression step to flatten, consolidate and compress said yarn at a temperature of from about 25° C. to about 137° C., thereby forming a tape article having an average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force;
   c) stretching said tape article at least once at a temperature in the range of from about 130° C. to about 160° C. at a stretch rate of from about 0.001 min$^{-1}$ to about 1 min$^{-1}$;
   d) optionally repeating step b) one or more times at a temperature from about 100° C. to about 160° C.;
   e) optionally repeating step c) one or more times;
   f) optionally relaxing the longitudinal tensile force between any of steps b) to e);
   g) optionally increasing the longitudinal tensile force between any of steps b) to e);
   h) cooling said tape article to a temperature less than about 70° C. under tension;

wherein the laminate optionally comprises resin other than the gel spun ultra-high molecular weight polyethylene, wherein said resin comprises not more than five percent by weight of the laminate.

2. The laminate of claim 1 wherein a ratio of a V50 ballistics value in meters per second of the laminate for a 17 grain frag into a test sample having an areal density of one pound per square foot to a tenacity in grams-force per denier of the tape precursor exceeds 17.

3. The laminate of claim 2 wherein the V50 ballistics value exceeds 606 meters per second.

4. The laminate of claim 1 wherein at least some of the multiple tape plies are oriented at angles relative to one another.

5. The laminate of claim 1 wherein the multiple tape plies of the tape are hot-pressed together for consolidation.

6. The laminate of claim 5 wherein, during hot-pressing, the tape plies are subjected to a temperature in excess of 137° C. during consolidation.

7. The laminate of claim 1 wherein said tape article has a tensile strength of at least about 2.2 GPa.

8. The laminate of claim 1 wherein the tape precursor formed from ultra-high molecular weight polyethylene gel spun, multi-filament yarns is substantially free of the resin.

9. The laminate of claim 1 wherein the tape precursor formed from ultra-high molecular weight polyethylene gel spun, multi-filament yarns has none of the resin.

10. The laminate of claim 9 wherein the resin is applied to at least one side of at least some of the tape precursors.

11. The laminate of claim 1 wherein portions of the yarns of the tape precursor are fused together to bind the yarns together to form the tape precursor.

12. The laminate of claim 1 wherein at least two adjacent tape plies of the multiple tape plies are directly fused together without any of the resin therebetween.

13. The laminate of claim 1 wherein, when a test sample made from the laminate is subjected to a three-point bend test according to ASTM D790 in which the test sample has a width of approximately 12.7 mm and a depth of approximately 7.88 mm and a span of approximate 12.19 cm, the test sample will yield at a stress at yield exceeding 55 MPa.

14. The laminate of claim 1 wherein the laminate exhibits improved high temperature strength over a comparison laminate, wherein the comparison laminate is equivalent to the laminate except that the comparison laminate includes more than 5 weight percent of the resin.

15. A method of making the laminate of claim 1, the method comprising:
   stacking multiple uni-directional tape plies on top of one another, each uni-directional tape ply being formed from a plurality of multi-filament tape precursors, each multi-filament tape precursor being thrilled from at least one ultra-nigh molecular weight polyethylene gel spun, multi-filament yarn; and
   applying a heat and a pressure for a duration of time to consolidate the multiple plies of tape into the laminate;
   wherein the laminate optionally comprises resin other than the gel spun ultra-high molecular weight polyethylene, wherein said resin comprises not more than five percent by weight of the laminate.

16. The method of claim 15 wherein the temperature during consolidation is in excess of 137° C.

17. The method of claim 15 wherein the tape precursor is substantially free of the resin.

18. The method of claim 15 further comprising the step of applying the resin to at least one side of the tape precursor before stacking the multiple plies of tape on top of one another and wherein, by applying a heat and a pressure for a duration of time to consolidate the multiple plies of tape into the laminate, the resin assists in consolidating the multiple plies of tape together.

19. The method of claim 15 wherein, when a test sample made from the laminate is subjected to a three-point bend test according to ASTM D790 in which the test sample has a width of approximately 12.7 mm and a depth of approximately 7.88 mm and a span of approximate 12.19 cm, the stress at yield for the test sample exceeds 55 MPa.

* * * * *